Aug. 8, 1961 T. J. GRENIER 2,995,697
TRANSISTOR FILTER
Filed Feb. 18, 1957

INVENTOR
T. J. GRENIER
BY
Walter M. Hill
ATTORNEY

United States Patent Office 2,995,697
Patented Aug. 8, 1961

2,995,697

TRANSISTOR FILTER

Thomas J. Grenier, Parsippany, N.J., assignor to Bell Telephone Laboratories, Incorporated, New York, N.Y., a corporation of New York Filed Feb. 18, 1957, Ser. No. 640,934
1 Claim. (Cl. 323—22)

This invention pertains to electrical filtering, and particularly to means for filtering ripple from a direct current.

A rectifier power supply for producing direct current from an alternating current power source generally includes a filter to remove the alternating current component which still remains after rectification. This alternating component is known as "hum," and includes a large number of sinusoidal currents of varying magnitudes at frequencies which are harmonics of the power source frequency. A similar situation exists even in the case of a power supply comprising a direct current power source, such as a direct current generator or a battery, since extraneous disturbances of the source or of the means of transmitting the direct current to the direct current load usually introduce disturbing alternating currents of various frequencies. These alternating currents are similar to those in hum, but are characterized as "noise" because of the random relationship of their frequencies as contrasted with the harmonic frequency relationships in hum. Of course, noise filtering is just as necessary as hum filtering, assuming equal magnitudes of both types of disturbances. The instant invention is concerned with filtering either type of alternating current, the term "ripple" being utilized hereinafter to refer to either, or both, noise and hum.

A conventional type of ripple filter comprises a resistor and a capacitor which are connected in series across the direct current power source. The direct current load is connected across the capacitor. If the total parallel impedance of the capacitor and the load at the lowest frequency of the ripple produced by the power source is small compared to the resistance of the resistor, virtually all of the ripple voltage will appear across the resistor and the direct voltage produced across the load will be virtually ripple-free. In order to attain a small total parallel impedance and at the same time to avoid excessive power loss and direct voltage drop in the resistor, the capacitor must have an impedance which is small compared to the load impedance. If such a filter is to be utilized to deliver large amounts of direct current power to the load with low power dissipation, and must also provide effective filtering against low ripple frequencies of the order of ten cycles per second, the required size of the capacitor becomes so enormous as to be prohibitive from an economic standpoint.

Accordingly, an object of this invention is to provide an improved ripple filter.

An additional object is to provide a compact and efficient ripple filter which achieves a desired degree of ripple attenuation by use of a relatively small and inexpensive reactive impedance.

In a preferred embodiment of the invention, two impedances are connected in series across the terminals of the direct current power source. The sizes and nature of these impedances are so related that substantially all of the ripple frequency voltage produced by the power source appears across one of them while substantially all of the direct voltage appears across the other. The direct current load is connected between one terminal of the power source and the emitter of a transistor, the collector of the transistor being connected to the other terminal of the power source. The junction between the two impedances is coupled to the base of the transistor. Nearly all of the ripple voltage produced by the power source then appears between the base and collector of the transistor, where it cannot affect the current in the emitter load. At the same time, nearly all of the direct voltage appears between said one power source terminal and the base of the transistor. Since the voltage drop between the base and emitter is small, substantially all of that voltage appears across the load.

For a given degree of ripple attenuation the invention permits use of a very much smaller filter capacitor than has heretofore been possible with ripple filters comprising a resistor and capacitor. In addition, by utilizing transistors a filter circuit constructed in accordance with the invention achieves the advantages of extreme compactness and very high efficiency.

Other features of the invention will be apparent from the following detailed specification and accompanying drawings, in which:

FIG. 1 is a drawing of a filter circuit in accordance with the invention utilizing a single transistor;

FIGS. 2(*a*), 2(*b*) and 2(*c*) are curves showing various operating characteristics of a typical junction transistor;

Figure 1:
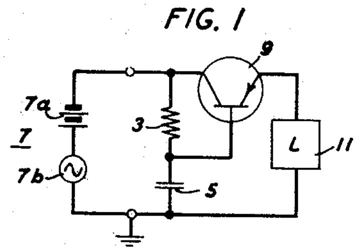

In FIG. 1 a resistor 3 and capacitor 5 are connected in series across the terminals of a direct current power source 7 represented by a battery **7*a* supplying pure direct current and a generator 7*b* supplying alternating ripple current. Physically, power source 7 may comprise an alternating current generator feeding a rectifier, or it may be a battery, or a direct current generator, or in general any means for supplying direct current containing a ripple component. To determine the required sizes of resistor 3 and capacitor 5, the ratio of the reactance of capacitor 5 to the resistance of resistor 3 for a desired degree of ripple attenuation is first determined. The largest size capacitor which can conveniently be used is then decided upon, and its reactance at the lowest anticipated ripple frequency is calculated. The size of resistor 3 is then calculated. For example, suppose that a ripple attenuation of about thirty decibels is required and that the largest capacitor which can conveniently be used is four microfarads. If the lowest ripple frequency to be filtered is ten cycles per second, the capacitive reactance will be about 4000 ohms at that frequency. If the resistance of the load connected across capacitor 5 is infinite, a resistor 3 of about 126,000 ohms will then yield the required attenuation. In accordance with the invention, even though the resistance of the load may be only a few hundred ohms, the apparent resistance presented across capacitor 5 will be so large that an "ideal" calculation of this type will be sufficiently accurate to achieve the desired degree of filtering. In addition, very little direct voltage drop and direct power loss will occur in resistor 3** or the other components of the filter circuit.

Assuming that transistor 9 is a p-n-p junction transistor, its collector is connected to the negative terminal of power source 7. The emitter is connected to one terminal of a load 11, the other terminal of which is connected to the positive terminal of source 7. The positive terminal of source 7 will be considered hereinafter as constituting the "ground" level of potential of the entire circuit. The base of transistor 9 is connected to the junction of resistor 3 and capacitor 5. It will be obvious that other well known types of transistors could be substituted, with minor circuit adaptions, for the type used to illustrate the invention.

Considering first the effect of battery 7a exclusive of ripple generator 7b, it will produce a voltage across capacitor 5 in a direction tending to make the emitter of transistor 9 more positive than the base. In addition, the emitter will be positive with respect to the collector.

Figure 2A:
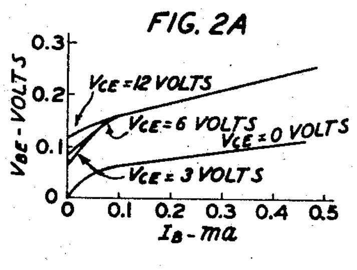
Figure 2B:
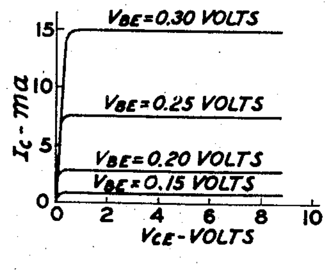

These polarities result in current flowing into the emitter and out of the collector. Some of the emitter current also flows out of the base and through resistor 3 to the negative terminal of battery 7a, thereby tending to produce a direct voltage drop across resistor 3. The ratio between the current flowing into the emitter and that flowing out of the base is given by $$\frac{1}{1-\alpha}$$

where $\alpha$ is the ratio of the current flowing out of the collector to that flowing into the emitter. By choosing transistor 9 as one having a value of $\alpha$ very close to unity, the base current will be a very small fraction of the emitter current. The base current flows through resistor 3, and so produces a small voltage drop ($V_{CB}$) between the collector and base relative to the direct voltage across capacitor 5 between the base and ground. In addition, the base-to-emitter voltage ($V_{BE}$) of a junction transistor remains only a small fraction of a volt when the base current ($I_B$) is small, and a small $V_{BE}$ can sustain a large collector current ($I_C$) and a large emitter current ($I_E$). This is evidenced by the typical junction transistor characteristic curves in FIGS. 2*a* and 2*b*; FIG. 2*a* showing the relationship between $V_{BE}$ and $I_B$ for various values of collector-to-emitter voltage ($V_{CE}$), and FIG. 2*b* showing the relationship between $V_{CE}$ and $I_C$ for various values of $V_{BE}$. Since the direct voltage across load 11 equals the direct voltage of battery 7a minus the sum of $V_{CB}$ and $V_{BE}$, it follows that nearly all of the battery voltage appears across the load. In view of the fact that the current in resistor 3 is very small, the direct power loss therein will also be small. The circuit is therefore a highly efficient means for coupling the direct voltage and direct current supplied by battery 7a to load 11.

An alternative description of the mechanism whereby nearly all the direct voltage produced by battery 7a appears across load 11 involves the effective resistance presented by transistor 9 and load 11 acros capacitor 5. That resistance would be infinite if no base current whatsoever were required, which would be the case if $\alpha$ were equal to unity. While $\alpha$ is actually less than unity, by utilizing a transistor for which that difference is small the resistance so presented to capacitor 5 is very large relative to the resistance of resistor 3. Consequently, the direct voltage existing between the base of transistor 9 and ground is a very large proportion of the direct voltage supplied by battery 7a. Since $V_{BE}$ is small, as explained above, the direct voltage across load 11 encompasses almost all that supplied by battery 7a.

Figure 2C:
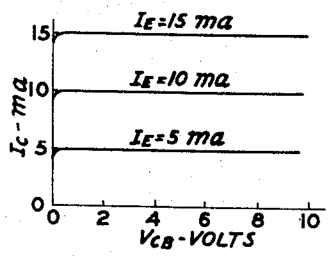

Now considering the effect of ripple generator 7b, since the reactance of capacitor 5 at the lowest ripple frequency is very small relative to the resistance of resistor 3, virtually no ripple voltage is produced across capacitor 5. This, of course, holds the alternating voltage to ground of the base of transistor 9 substantially at zero. Virtually all of the ripple voltage supplied by generator 7b then appears across resistor 3 as a collector-to-base voltage ($V_{CB}$). However, as shown by the junction transistor characteristic curves in FIG. 2*c* of $I_C$ versus $V_{CB}$ for various values of $I_E$, a variation in $V_{CB}$ has very little effect on either $I_E$ or $I_C$. Since $I_B$ equals the difference between $I_E$ and $I_C$, it remains practically constant. Reference to the curves in FIG. 2*a* then shows that $V_{BE}$ still remains only a fraction of a volt. Of course, $V_{CE}$ may vary considerably. As the voltage across load 11 is equal to the difference between the voltage to ground of the base of transistor 9 and $V_{BE}$, it follows that the alternating or ripple voltage across load 11 remains substantially at zero in spite of the existence of the ripple voltage $V_{CB}$. In the series loop comprising load 11 and the emitter-to-collector path of transistor 9, practically all of the ripple voltage supplied by generator 7b will appear as a voltage $V_{CE}$ between the emitter and collector.

It should be noted that, while there is superficial resemblance between the circuit of FIG. 1 and that of a conventional emitter follower circuit, there are major differences in construction and mode of operation. In an emitter follower the varying "signal" is applied between the base and collector and the resultant varying output voltage is developed between the emitter and collector. In FIG. 1 the ripple voltage is applied between the base and collector, but the output voltage is developed between the emitter and base and does not vary in response to the ripple voltage. In this respect there is some resemblance to a conventional grounded base circuit, but the circuit illustrated in FIG. 1 differs therefrom in that the input voltage is applied to the conventional output voltage terminals and the output voltage is obtained at the conventional input voltage terminals. Additionally, in an emitter follower circuit there is a signal source coupled to the base while a separate source supplies direct operating potential to the collector. Thus, two sources are involved. This is not true of the instant invention, where there is no actual "signal" in the usual sense. Instead, there is only a single voltage source which may contain an unwanted ripple component. This source supplies operating potential to the collector, while a substantially ripple-free voltage, derived from the same source, is applied to the base.

The circuit shown in FIG. 1 will perform adequately if a transistor having a value of $\alpha$ close to unity is utilized, or if the required load current is small enough so that a transistor having an otherwise inadequate $\alpha$ can supply that current with a very small base current. However, if a large load current of the order of 100 milliamperes is required, a typical p-n-p- junction transistor 9 such as that coded 2N68 will require a base current of 4.2 milliamperes. This current would flow in resistor 3 in the circuit of FIG. 1, and as the latter will usually be of the order of thousands of ohms a prohibitive loss of direct voltage and power would occur. If it should be attempted to reduce this loss by reducing the resistance of resistor 3, the maintenance of an adequate degree of ripple filtering would then necessitate increasing the size of capacitor 5. Thus, of course, is one of the deficiencies of the prior art which the instant invention is designed to circumvent. Accordingly, for supplying very large load currents a modification of the circuit of FIG. 1 such as that shown in FIG. 3 may be utilized.

Figure 3:
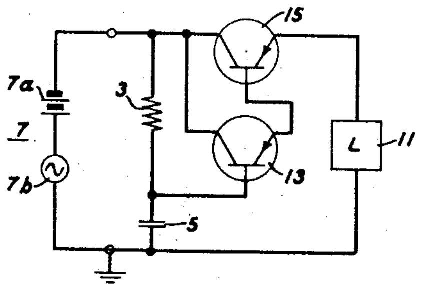
FIG. 3 is a drawing of a filter circuit in accordance with the invention utilizing a pair of transistors.

The embodiment of the invention shown in FIG. 3 utilizes the same operating principles as that of FIG. 1, but includes two transistors connected so as to achieve a very large effective ratio of load current to base current. That is, a very small voltage drop is produced across the resistor in the filter circuit even though a very large load current is required. In FIG. 3 power source 7, resistor 3 and capacitor 5 are the same as in FIG. 1. However, the junction of resistor 3 and capacitor 5 is connected to the base of a low power p-n-p junction transistor 13 which requires only a very small base current, of the order of less than one-hundred microamperes, to produce an emitter current of the order of a few milliamperes. The junction transistor coded 2N104 will be adequate for this purpose, since it requires a base current of only about 50 microamperes to produce an emitter current of about 4 milliamperes. The collector of transistor 13 is connected to the negative terminal of power source 7 to receive direct operating potential therefrom. The output of transistor 13 is produced at the emitter, as in the case of transistor 9 in the circuit of FIG. 1. However, instead of connecting the emitter of transistor 13 to load 11, the emitter is connected to the base of a much higher power p-n-p junction transistor 15 which may be of the type coded 2N68 mentioned previously. The emitter current of transistor 13 then serves as the base current of transistor 15, and produces a very large emitter current in transistor 15 which may be of the order of 100 milliamperes. Direct operating potential for the collector of transistor 15 is obtained by connecting that electrode directly to the negative terminal of power source 7.

For the typical transistor values given above, the collector current of transistor 15 will be 100 milliamperes when the base current is 4 milliamperes, and the collector current of transistor 13 will be 4 milliamperes when its base current is .05 milliampere. The ratio of the current in load 11 to that in resistor 3 is then $$\frac{100}{4}\times\frac{4}{.05}=2000$$

As a result, the resistance of resistor 3 can be one-hundred times that of load 11 and yet the voltage drop across resistor 3 will be only one-twentieth of that across load 11. Ninety-five percent of the direct voltage produced across the terminals of power supply 7 will then appear across load 11. The two-transistor circuit of FIG. 3 may be regarded as the equivalent of a hypothetical single transistor having a value of $\alpha$ very much closer to unity than can be achieved with an actual single transistor using a circuit as in FIG. 1. Transistor 13 serves as a means for coupling the junction of resistor 3 and capacitor 5 to the base of the transistor 15, while the latter transistor functions the same as transistor 9 in FIG. 1.

Figure 4:
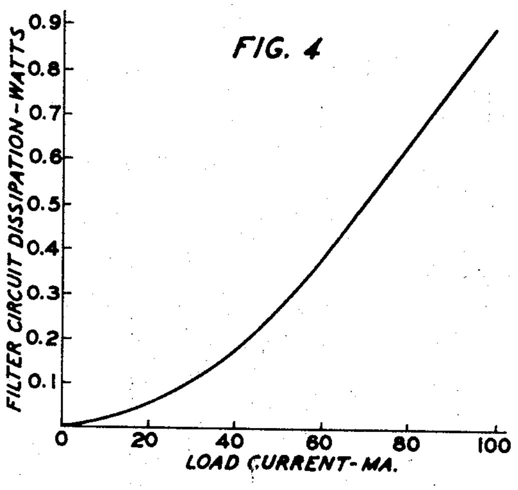
FIG. 4 is a curve showing the relationship between direct load current and power dissipation in the filter circuit of FIG. 3.

A curve showing the relationship between the power loss of a filter circuit of the type shown in FIG. 3 and the current supplied to the load is shown in FIG. 4. For a constant load current it is evident that the circuit efficiency can be increased by increasing the direct voltage produced by power supply 7.

Figure 5:
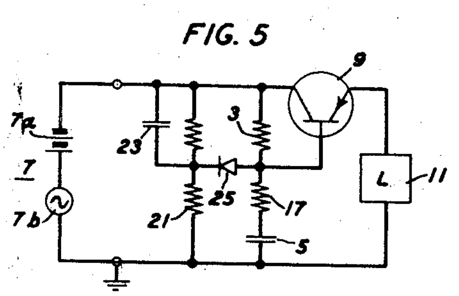
FIG. 5 is a circuit drawing of a filter circuit similar to that shown in FIG. 1 but including means for protecting the transistor from excessive base-to-collector voltage as a result of sudden transients.

In both the circuit of FIG. 1 and that of FIG. 3 it is advisable to provide means for preventing the base-to-collector voltage of any of the transistors from exceeding the breakdown level at which a large reverse current flows between those electrodes. Such current would cause permanent damage to the transistor. A large increase in base-to-collector voltage may be due to transients which occur when the power supply is first connected to the filter circuit, or due to sudden momentary disturbances of the power source. In FIG. 5 is shown a filter circuit constructed similarly to that of FIG. 1, but including means for preventing the base-to-collector voltage of transistor 9 from exceeding a safe level. The emitter of transistor 9 is connected to a grounded load 11, and the collector is connected to the negative terminal of power supply 7. A filter resistor 3 and capacitor 5, which may be the same as in the circuit of FIG. 1, are connected together in series by a small resistor 17 which may be of the order of a few hundred ohms. The base of transistor 9 is connected to the junction of resistors 3 and 17. A voltage divider comprising a pair of resistors 19 and 21 in series is connected across the terminals of power source 7, the resistance of resistor 21 being much greater (for example twenty times) than that of resistor 19. A capacitor 23 is connected across resistor 19, and may be fifteen or twenty times the capacitance of capacitor 5. As will be evident from the ensuing description, capacitor 23 only need withstand a small portion, for example one-twentieth, of the voltage developed across capacitor 5. Consequently, in spite of its relatively large capacitance it will still be physically small and inexpensive. The anode of a diode 25 is connected to the base of transistor 9, the cathode being connected to the junction of resistors 19 and 21.

Assume that power source 7 has just been connected into the circuit as described, as by throwing a switch, or that it has just begun to deliver power, or that in some way a transient has occurred which produces a sudden increase in the magnitude of the supplied direct voltage. Initially, the entire direct voltage supplied by source 7 will appear across resistor 17 in the series path comprising capacitor 5, resistor 17, diode 25, and capacitor 23. Resistor 17 then limits the maximum current by diode 25, and the voltage across resistor 3 is zero. Capacitors 5 and 23 now begin to charge, but since capacitor 5 is much the smaller of the two its charging rate and the rate of increase of the voltage across it is much more rapid. The voltage across resistor 3 during this interval is equal to that across capacitor 23, and remains relatively small because the maximum voltage across that capacitor is limited by the voltage division between small resistor 19 and large resistor 21. As the voltage across capacitor 23 approaches its maximum value the voltage existing across resistor 21 decreases. Since the voltage across capacitor 5 is rapidly increasing, in a relatively short time it becomes equal to that across resistor 21. When that happens diode 25 becomes nonconductive. Capacitor 5 then completes its charge through resistors 3 tnd 17, the voltage across resistor 3 becoming substantially equal to the difference between the direct voltage supplied by source 7 and the voltage across capacitor 5. It is thus seen that the collector-to-base voltage of transistor 9 is limited to a safe value during sudden increases in the voltage of power source 7. After capacitor 5 has become fully charged, the circuit operates in virtually the same manner as that described above with reference to FIG. 1, resistor 17 being so small relative to the resistance of resistor 3 that its effect in the circuit is negligible.

What is claimed is:

A filter circuit comprising a transistor having a base, an emitter connected to one terminal of a load and a collector connected to a source of voltage containing a direct component and a ripple component, and means comprising said transistor for removing substantially all of the ripple component of the voltage supplied to the load and for limiting the voltage applied to said transistor, said last-mentioned means further comprising a parallel resistance and capacitance network connected to said collector, diode means connecting said base to said parallel network, a first resistor connecting said collector to said base, a series resistance and capacitance network connected between said base and the other terminal of the load, and a second resistor connecting said other terminal of the load to the connection between said diode and said parallel network.

References Cited in the file of this patent

UNITED STATES PATENTS

| | | |
|---|---|---|
| 2,693,568 | Chase | Nov. 2, 1954 |
| 2,745,956 | Baker | May 15, 1956 |
| 2,801,346 | Rongen et al. | July 20, 1957 |
| 2,897,430 | Te Winkel | July 28, 1959 |

FOREIGN PATENTS

| | | |
|---|---|---|
| 752,055 | Great Britain | July 4, 1956 |